United States Patent
Allain et al.

[11] Patent Number: 6,059,105
[45] Date of Patent: *May 9, 2000

[54] MOTOR VEHICLE AND VALUABLE POSSESSION FLOOD PROTECTION APPARATUS AND METHOD

[76] Inventors: Mark Allain; Joseph Allain, Jr., both of 4932 Chantilly Dr., New Orleans, La. 70126

[*] Notice: Under 35 U.S.C. 154(b), the term of this patent shall be extended for 772 days.

[21] Appl. No.: 08/660,663

[22] Filed: Jun. 5, 1996

[51] Int. Cl.⁷ .................................................. B65D 85/68
[52] U.S. Cl. ........................................ 206/335; 150/166
[58] Field of Search ..................................... 206/335, 522, 206/806, 597; 383/72, 100, 113; 150/166–168, 901, 154, 158; 53/459, 464; 296/130, 136; 24/67.3, 67.5, 67.7, 67.9

[56] References Cited

U.S. PATENT DOCUMENTS

| | | | |
|---|---|---|---|
| 2,646,097 | 7/1953 | Gaverth et al. | 150/166 |
| 3,044,516 | 7/1962 | Stoll | 150/166 |
| 3,884,523 | 5/1975 | Allen | 206/335 |
| 4,315,535 | 2/1982 | Battle | 206/335 |
| 4,773,456 | 9/1988 | Rodgers | 206/335 |
| 4,979,339 | 12/1990 | Jones et al. | 150/166 |
| 5,176,421 | 1/1993 | Fasiska | 150/166 |
| 5,282,502 | 2/1994 | Ballard | 206/335 |
| 5,287,614 | 2/1994 | Ehrlich | 150/158 |
| 5,458,945 | 10/1995 | Tall | 150/166 |

*Primary Examiner*—Paul T. Sewell
*Assistant Examiner*—Luan K. Bui
*Attorney, Agent, or Firm*—Jim Zegeer

[57] ABSTRACT

A motor vehicle flood protection apparatus and method includes a lower plastic container or cover member having a rectangular bottom panel and integrally joined end, and side panels that have lateral edges joined to form a leak proof vehicle container or bag. The end and side panels have a vertical height that is less than the height of a vehicle to be flood protected but well above the float level for the vehicle type and of sufficient height that, when surrounded by flood waters, the container floats with the vehicle carried therein. The upper edges of the side and end panels have elastic and/or drawstring snugging devices to snug the upper edges against the vehicle. A top cover member is fitted over the upper edges of the bottom cover in a way so as to shed rain water and/or splashing floor waters. A tether or anchor device secures the lower plastic container member to a stationary object.

18 Claims, 15 Drawing Sheets

MOTOR VEHICLE AND VALUABLE POSSESSION FLOOD PROTECTION APPARATUS AND METHOD

BACKGROUND AND BRIEF DESCRIPTION OF THE INVENTION

This invention relates to an apparatus and method for protecting automotive vehicles from damage by flood waters.

Motor vehicle flood protection devices are known in the prior art as shown in Battle U.S. Pat. No. 4,315,535. Battle shows a flood protection apparatus in which a unitary flexible plastic bag receives and encloses a motor vehicle and has a draw string for closing the top of the container over the top of the vehicle and gathering-in the open top. This device requires an excessive amount of material (the bag opening would have to be as wide as the base or approximately so, to get the vehicle into the bag, then the draw string gathers in approximately 40 feet plus of material. Water could splash over the top of the bag and gain entrance to the confined space, and rain water could also enter the space. In Rogers U.S. Pat. No. 4,773,456, individual seals are subject to considerable variation in application and could easily leak thus defeating the purpose of the container. These two references refer to other prior art references that may be consulted for further prior art expediencies.

We have discovered that when the flood water levels are about 1–2 feet or greater above ground level, the average vehicle, such as a car or pickup truck, in a flexible waterproof container as disclosed herein. If the waterproof container has a sealed upper edge that is at a level at least greater in height than the height of the flood water and rain or splashing flood waters are prevented from entering the lower container portion and the lower portion is tethered or otherwise anchored to some fixed object such as a telephone pole, power pole, concrete slab, weights, etc., the car will be protected. Anchoring or otherwise tethering the container prevents the floating car from being damaged and damaging other objects due to the movement given to it by the flowing flood waters. At the same time, tethering or anchoring the vehicle container and the vehicle prevents puncturing or other damage to the container.

Moreover, since the receptacle or container can float and the car can float in a relatively low level of flood water, it is not necessary in a preferred embodiment to join the cover to the top edge by a watertight seal against flood waters.

Apart from requiring an excess of material, when the top of the container is gathered-in, as in Battle U.S. Pat. No. 4,315,535, rain water and splashing flood waters can enter the top and, instead of being damaged by rising flood waters, the vehicle can be damaged by the collected rain water and/or splashed-in rain water.

In one preferred embodiment of the invention top and bottom tough water impervious rectangular plastic sheets are hermetically sealed together on three sides to form a vehicle-receiving envelope with the unsealed sides being open and of sufficient size to allow a vehicle to be driven into the envelope and the driver to exit from it. In this embodiment, the material is semi-opaque and has colored (red, for example) guideline marks, a "T" for example, on the top cover sheet and the driver advances the vehicle, aligning with the stem of the "T" and when the cross or horizontal of the "T" is seen at the top front part of the hood, the vehicle is stopped. The driver exits and the car envelope is sealed by rolling up the vehicle entrance or open end on a rigid member and clamped, and then tethered to prevent drifting with flood water currents.

Since in most situations it is unnecessary to render the entire bag leak-proof, in a further preferred embodiment, the present invention seeks to provide a cover for the container that sheds or causes the rain water to runoff.

In a further preferred embodiment, a top cover is provided that overlaps and is secured in place to the lower waterproof container portion, such that rain water or splashing flood waters are precluded from entering the floating container thereby protecting the vehicle therein. In many cases, vehicle owners may already have conventional vehicle covers which can serve as the top cover.

In a further preferred embodiment of the invention, the tetherable or anchorable car container or receptacle has its upper edges provided with a drawstring and/or elastic or other pliable member extending about the opening and which is adapted to be shortened to pull the upper edges snugly against the top sides of the vehicle passenger compartment and well above the float level for the vehicle type used. As used herein, the term, "float level for the vehicle type", means for a given vehicle type, weight and a given size or volume of lower container, the height of the bag or receptacle portion required to cover the vehicle's structure from the ground level to where the container or receptacle, with the given vehicle in it, begins to float.

A gathering rope or drawstring, in a gathering rope passage formed in the upper edges of the sidewalls and end walls of the lower or bottom container or vehicle receptacle, gathers in the edges of the sidewalls snugly against the upper cabin portion or passenger compartment of the vehicle so that when the top cover is fastened in place, the lateral perimetrical edges of the top cover panel are overlapped and positioned below the upper edges of the walls of the receptacle or container. In this way, instead of seeking to make the entire container impervious or waterproof as in the first described embodiment, only the lower portions of the vehicle container or receptacle are made fully waterproof and this need only be up to a certain point or level to assure the floatability of the container or receptacle with a vehicle in it. Care is taken in the design of the present invention to assure that rain water and flashing flood waters do not enter the container but, rather, fall on the top cover panel and flow or run off easily into the surrounding flood waters. To this end, an elastic hem is formed on certain portions of the upper edges of the sidewall panels and end walls and a tether or anchor member is secured to the flexible plastic receptacle or container next to the lower edges of it, and an anchor stake or other anchor member means is used to secure or tether the container or receptacle to a stationary object. In a preferred embodiment, the tether line carries measurement indicia so that measured amounts or lengths of tether line, according to the expected or anticipated height or level of flood waters, can be selected.

In a still further embodiment, the bottom and top covers are comprised of two rectangular sheets of waterproof material which hermetically are sealed at one corner and two adjacent or intersecting sides. The corner of the top cover sheet is lifted at its free edges by one individual to allow the vehicle to be driven in the space defined in part by the two sealed and intersecting sides or edges. The unsealed or free edges are then rolled on a relatively rigid member and the rolled-up edges clamped by large shielded clamps to maintain the seal.

In each embodiment, the bottom panel may include means to reduce the likelihood of puncture such as being a thicker plastic membrane or the bottom panel can include a layer of burlap, spun polyethylene or rip stock nylon.

While the present invention is directed to protecting vehicles from flood waters, it will be appreciated that the invention can be used to protect large and valuable possessions from impending flood conditions. By providing a water-impervious receptacle having a floatable lower plastic portion and loading the receptacle with said possessions, and placing rain water and splashing flood water impervious cover over the possessions in an overlapping relation to the lower plastic portion so that rain water and splashing flood water run off and tether the lower container to an immobile object with a tether line of sufficient length to allow the lower plastic portion to drift with flowing flood waters to the end of the tether line, these possessions can similarly be protected.

In one preferred embodiment, the cover bag of waterproof material is supplied on a flexible plastic roller that is useful in rapidly applying the bottom or lower cover or bag portion to the vehicle. The lower bag is initially looped around the front or engine compartment of the vehicle (an automobile or small pickup truck) and the roller is placed snugly in the notch formed by the front wheels and ground or pavement. Sufficient "excess" cover is pulled off of the roller to allow for the vehicle advancement over the roller two times (front and rear wheels). The roller and the external surface of the bottom panel can have markings for wheel alignment and are matched with the vehicle wheels. The vehicle is then driven or pushed forward just over the roller and stopped. The roller is then unrolled to the rear wheels and placed snugly in the notch formed by the rear wheels and ground or pavement. The vehicle is advanced forward over the roller and stopped. Then the remaining cover material is taken off of the roller and placed over the rear or trunk portion of the vehicle. The cover will be held snugly in place by the elastic band and/or drawstring or cord around the top or upper edges of the bottom or lower cover. The top or upper cover is then placed over the top of the vehicle so that the lower edges of the top cover portion overlays or overlaps the upper sides and edges of the bottom or lower cover portion. The top cover portion is secured in place by an elastic and/or draw string or cord. The tether or anchor attachments are then secured to a stationary object, as the vehicle will float after sufficient flood water has accumulated. In this embodiment, it will be appreciated that the fitting of the bottom cover portion to the vehicle can begin from the rear or trunk area. The material for the top cover portion can be a lightweight PVC, spun bound polypropylene and similar materials. Moreover, some vehicle owners may already have conventional vehicle covers which can serve as the top cover in this two-piece embodiment. The sizes will vary according to the classification size for the vehicle: subcompact, compact, intermediate and full size.

DESCRIPTION OF THE DRAWINGS

The above and other objects, advantages and features of the invention will become more apparent when considered with the following specification and accompanying drawings in which.

Figure 1A:
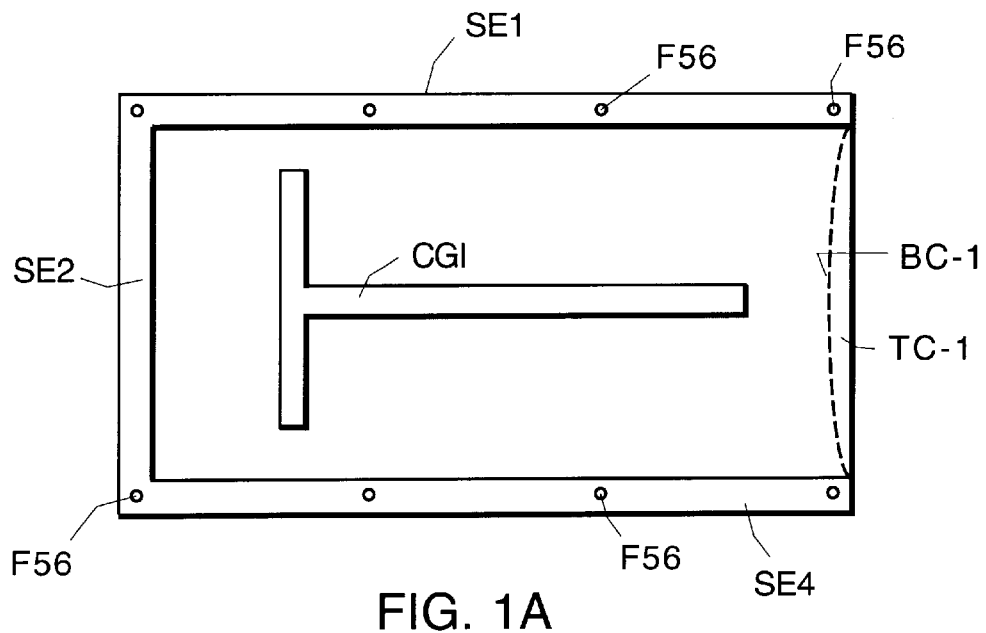
FIG. 1A is a top plan view of one preferred embodiment of the invention showing the open end of the vehicle envelope or bag for vehicle entrance.
Figure 1B:
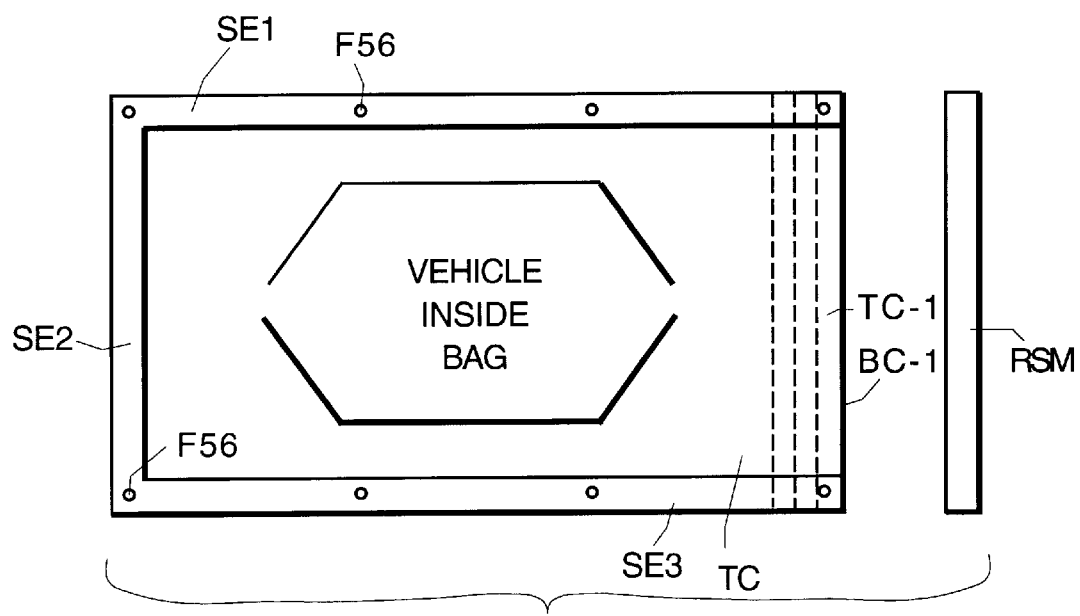
FIG. 1B is a top plan view of the embodiment of FIG. 1A with a vehicle enclosed.
Figure 1C:
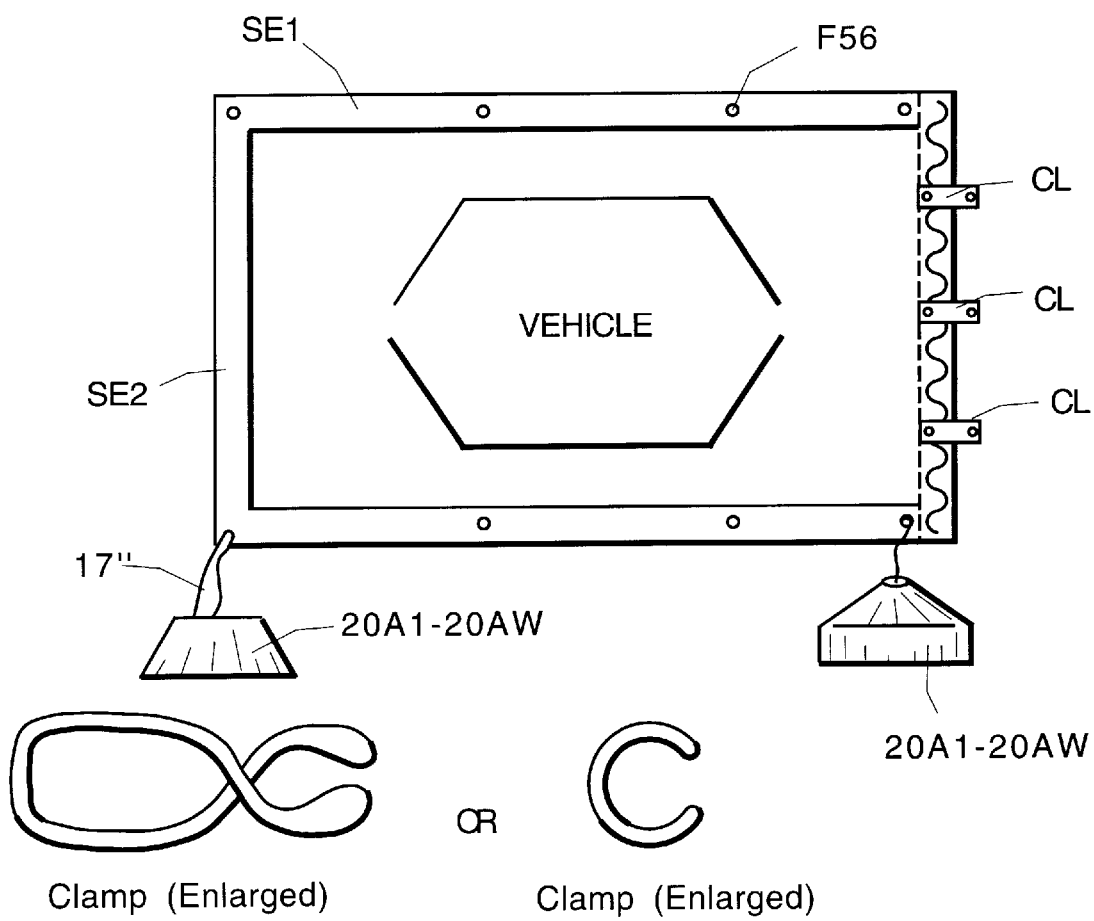
FIG. 1C is a top plan view of the embodiment of FIG. 1 after the open end has been rolled on the rigid member and seal clamp(s) applied.
Figure 2A:
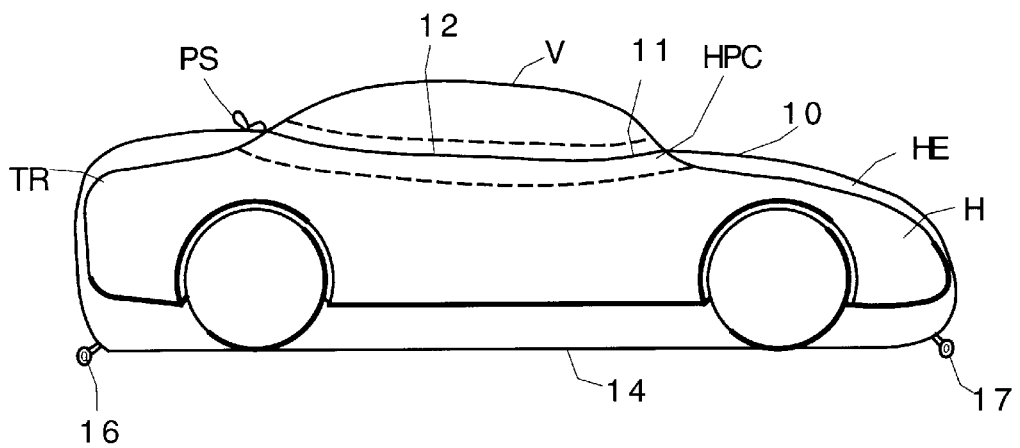
FIG. 2A is a side elevational view showing a vehicle in the lower container or receptacle portion of the device with the elastic and/or draw string closing the top opening snugly against most of the upper portion of the passenger compartment or cabin of a vehicle.
Figure 2B:
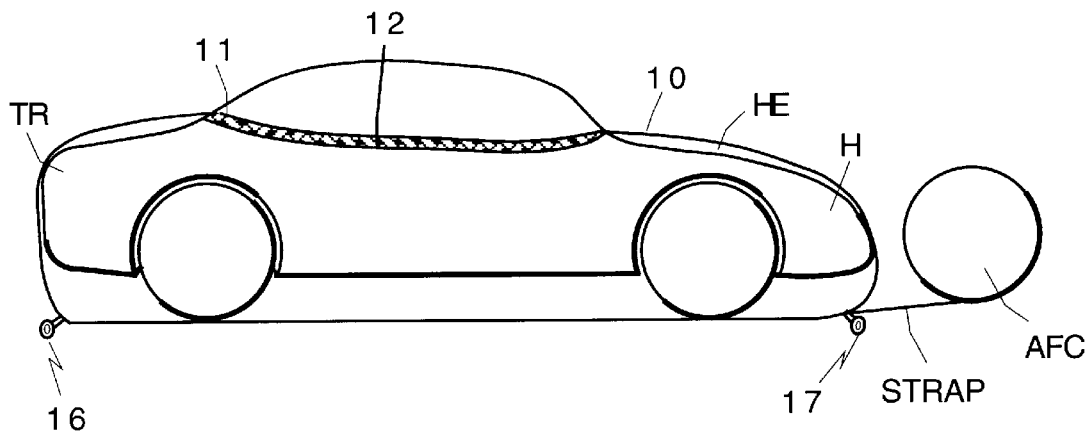
FIG. 2B illustrates the attachment of the air flotation ballast.

DETAILED DESCRIPTION OF THE INVENTION:

In a first preferred embodiment shown in FIGS. 1A–1C, a rectangular top cover sheet TC-1 is hermetically sealed on three congruent side edges SE1, SE2, SE3 to a rectangular bottom cover sheet BC-1. In this embodiment the hermetically sealed edges SE1, SE2, SE3 are made wide enough to allow tether and flotation securement grommets FSG to be provided in the side edges at about 3-feet spacing. A colored guide indicia CGI is imprinted or adhered to the top cover sheet TC-1. The material of the top cover sheet TC-1 is transparent or semi-transparent or semi-opaque so that the indicia is easily seen by the vehicle driver. The vehicle is positioned with the stem of the "T" centered with the vehicle, and the driver advances the vehicle until the cross of the "T" intersects the stem at the beginning of the top front of the hood. The driver exits from the vehicle envelope (room or space has been allocated to allow for this maneuver) and the envelope sealed by rolling the open edge over a rigid strip member RSM (FIG. 1B) and retaining this fold or roll by means of clamp(s) CL (FIG. 1C). A single plastic tubular clamp where the "spring" is in the material may be used.

Referring now the embodiment of to FIGS. 2–5, a bottom cover or receptacle portion 10 (FIG. 4), which can be made of vinyl coated rip-stop plastic fabric so that it is leak-proof and very flexible and tough, is provided with an opening 11 bounded by a snugging device 12 such as a drawstring hem or an elastic or a combination of a drawstring and elastic hems so that opening 11 can be closed snugly against the upper passenger compartment UPC (diagrammatically delineated by the dashed band UPC) of the vehicle V to be protected against flood waters. When the flood water levels are about 1 foot or greater, the average vehicle, such as a car or pickup truck, in the flexible waterproof container 10 of this invention will float when the water is at about that height or greater above ground level. The waterproof container 10 has an upper edge that is at a level at least greater than the height of the flood water. The lower portion is tethered or otherwise anchored to some fixed object such as a telephone pole, power pole, concrete slab, weights (FIG. 11F), etc., the car will be protected. Anchoring or otherwise tethering the container prevents the floating car from being damaged and damaging other objects due to the movement given to it by the flowing flood waters. At the same time, tethering or anchoring the vehicle container and the vehicle prevents puncturing or other damage to the container. Tether or anchor points 16, 17 are secured to the lower cover portion 10. Although two tether or anchor points are shown and preferred, more or less tether or anchor points can be used.

The bottom panel 14 is made of a heavier gauge material and/or lined with burlap to avoid punctures and to better withstand loading and water pressures when floating and better securement for the tether or anchor points. When the flood waters surrounding the lower cover begin to exert pressure on the external surfaces of the cover, the flexibility of the material forces some air out as the material is pressed against the tires and sides of the vehicle. The closing of opening 11 and tightening snugging device 12 against the upper passenger compartment UPC by drawstring or cord DS retains the upper edge of the lower or bottom container portion 10 in place at the upper passenger compartment portion UPC.

Figure 3A:
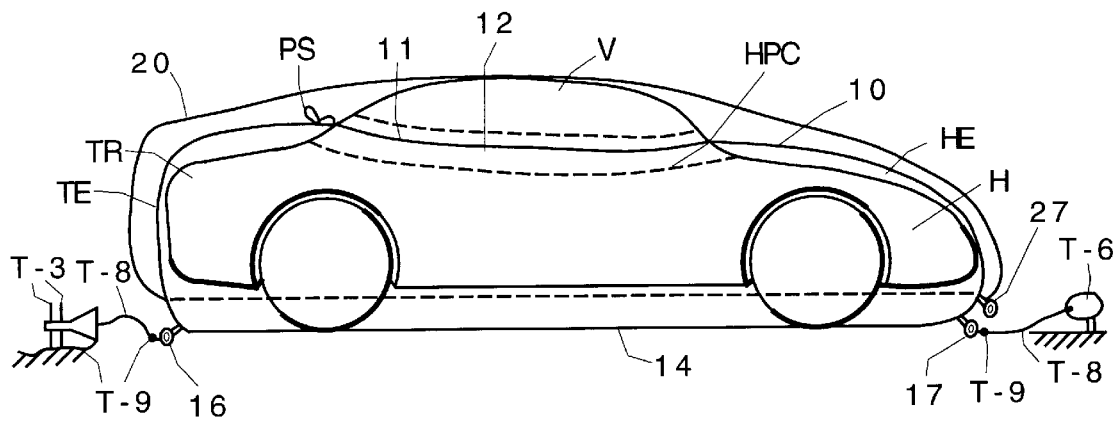
FIG. 3A is a side elevational view of a further embodiment showing the top panel member fastened in place and overlapping the upper edge of the lower container or receptacle to cause rain water and splashing flood waters to run off and not collect within the lower container or receptacle.

Upper cover member 20 (FIG. 5) can, in this embodiment, be a conventional "car cover", its primary purpose being to keep rain water and splashing flood waters from entering any spaces between the vehicle and where the upper inside edge surfaces engage the upper passenger compartment surfaces UPC. In this respect it can be a tarpaulin whose corners are secured to the vehicle wheels. Preferably, upper cover member 20 has an elastic snugging hem 21 edging the vehicle receiving opening 22 and has a hood or engine end 23 and a trunk receiving end 24 which fit over the hood 25 and trunk 26 (FIG. 3), respectively, of the vehicle V. The snugging hem 21 may include a drawstring or cord 27 (FIG. 3).

Figure 4:
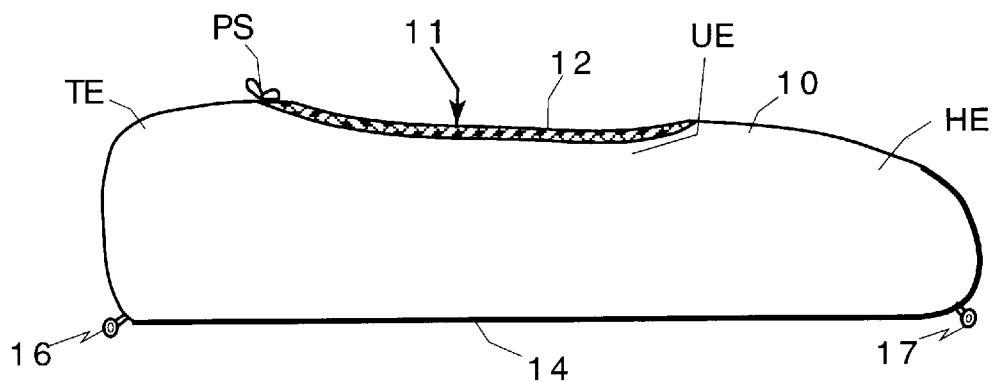
FIG. 4 is a side view of the bottom or lower cover or receptacle according to FIG. 2.
Figure 5:
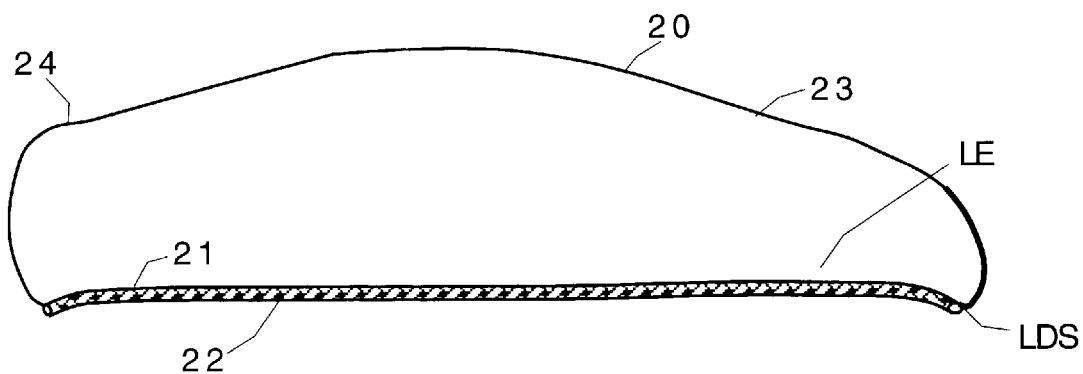
FIG. 5 is a side view of the top or upper cover of the vehicle flood protector according to the invention.

Tether rings 16 and 17 are illustrated in FIG. 4 and FIG. 11, and include a ring T-1 with a short strap T-2 looped through ring T-1 at one end and joined to the lower front and rear ends of bottom cover 10. A flat headed spike T-3 having a tethering ring T-4 secured thereto, or a tether spike T-5 having an integral tether ring T-6 form on one end and an earth penetrating point T-7 on the other end can be driven into the earth at distances spaced apart appropriate to the length of the vehicle. A length adjustable tether strap T-8 has tether snap hooks T-9 at both ends which are hooked to the tether rings T-4 or T-6. Tether straps T-8 are preferably about 10 feet long and can be adjusted by buckle 11EB for greater or shorter lengths if desired and have length indicia LI so the user can select the desired length of the tether straps T-8 (FIG. 12E), and thereby control movement of the vehicle or possessions when the assemblage is floating. Various optional weighted anchors 12A-1, 12A-2, 12AS-3 and 12A-4 can be provided if there are no convenient stationary objects.

Figure 3B:
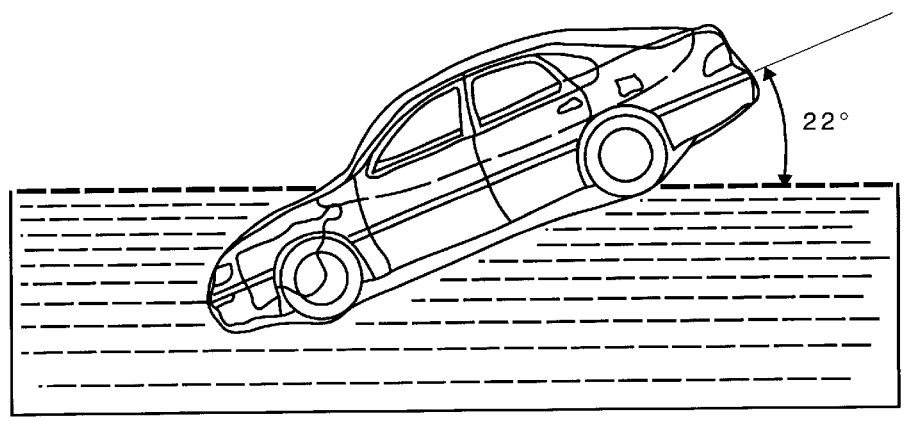
FIG. 3B illustrates the tilt of a vehicle due to vehicle engine weight.
Figure 3C:
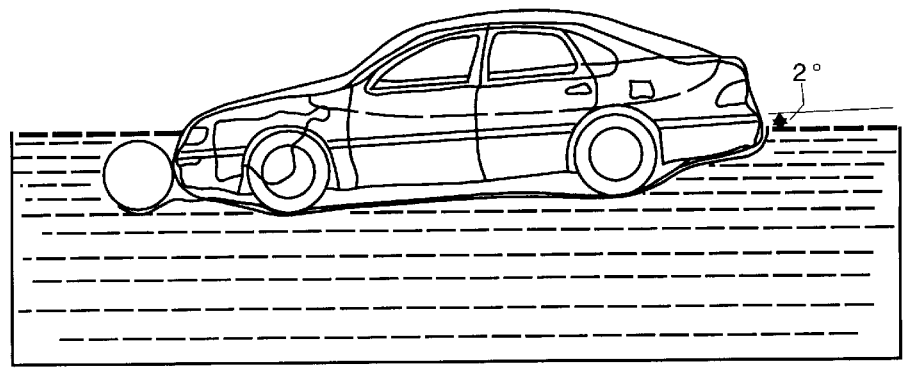
FIG. 3C is a side elevational view showing the attachment of flotation ballast to assure that the weight of the vehicle motor does not cause excessive tilt in the protected vehicle.

As shown in FIG. 3B, the weight of the engine of the vehicle can cause the vehicle in its protective container to tilt (as much as about 46°) thereby decreasing the safety line between the upper open edge of the lower flotation bag or container and the water level. An air flotation container AFC (FIG. 3C) may optionally be secured by flexible straps AFCS which attach the flotation ballast AFC to the bottom of the lower container portion. With the flotation container AFC the angle of tilt is in the range of about 2–3 degrees (FIG. 3C). The lengths of straps AFCS can be adjusted by buckles AFCB as well as their points of securement to the lower cover portion to thereby adjust the level of flotation compensation for the vehicle engine weight unbalance factor.

The flotation container AFC contains about 30 cubic feet of air and preferably has a sealable but removable cover AFCO. While foam flotation can obviously be substituted, the container version is preferred since it can serve as a storage container for the cover, and its components and is less bulky for a given level of buoyancy.

Figure 6:
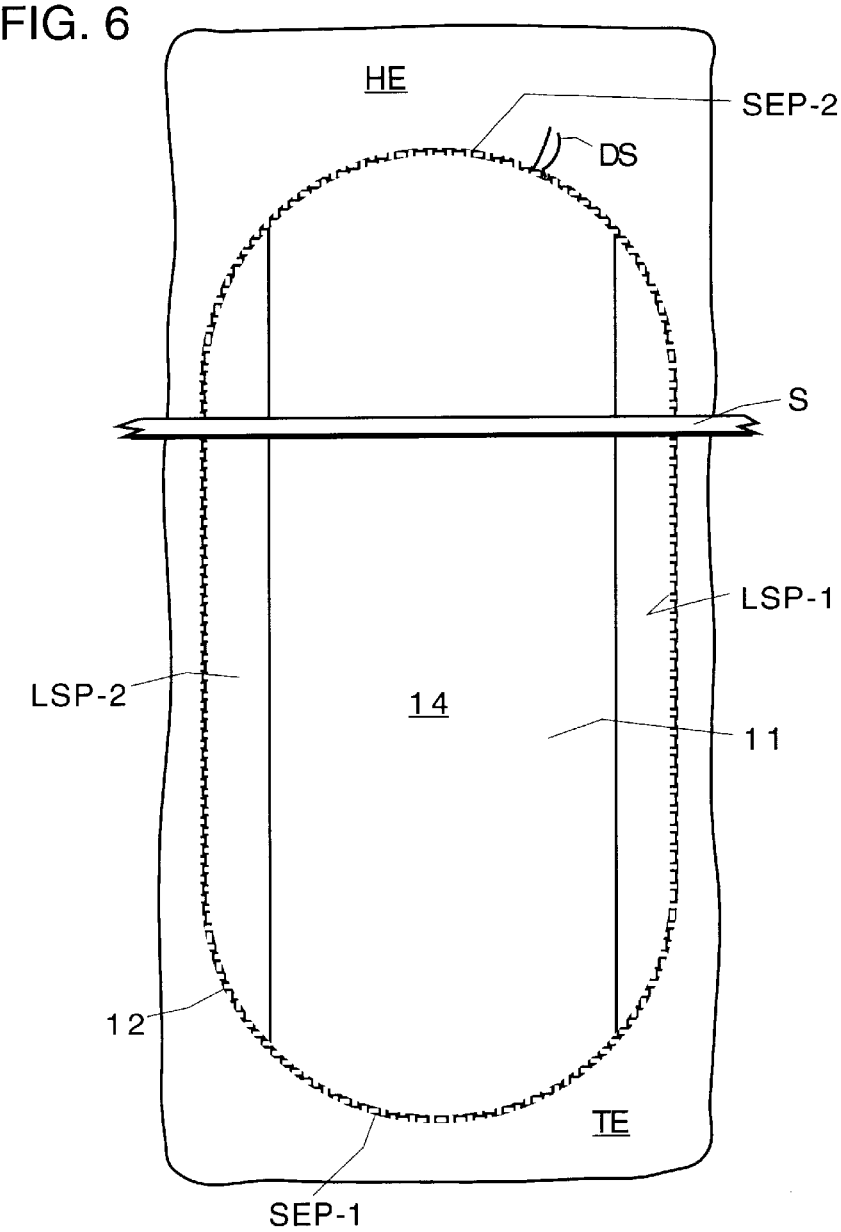
FIG. 6 is a top plan view of the bottom or lower vehicle flood protection container of FIGS. 2A and 4 before it is rolled up on a flexible plastic spool and incorporating the invention.
Figure 7:
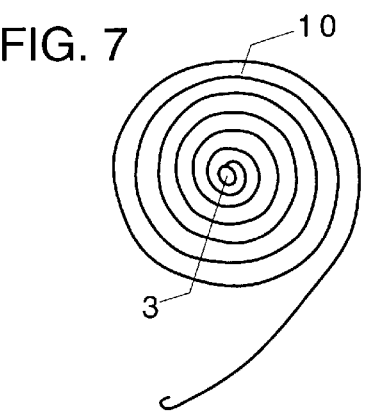
FIG. 7 is a side elevational view of the bottom cover or bag rolled up on the flexible plastic spool.
Figure 8:
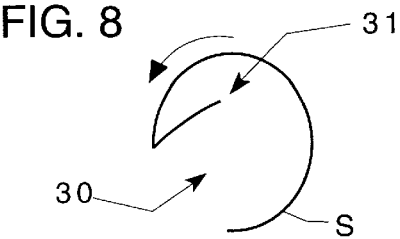
FIG. 8 is an end cross-sectional view of the plastic spool.
Figure 9:
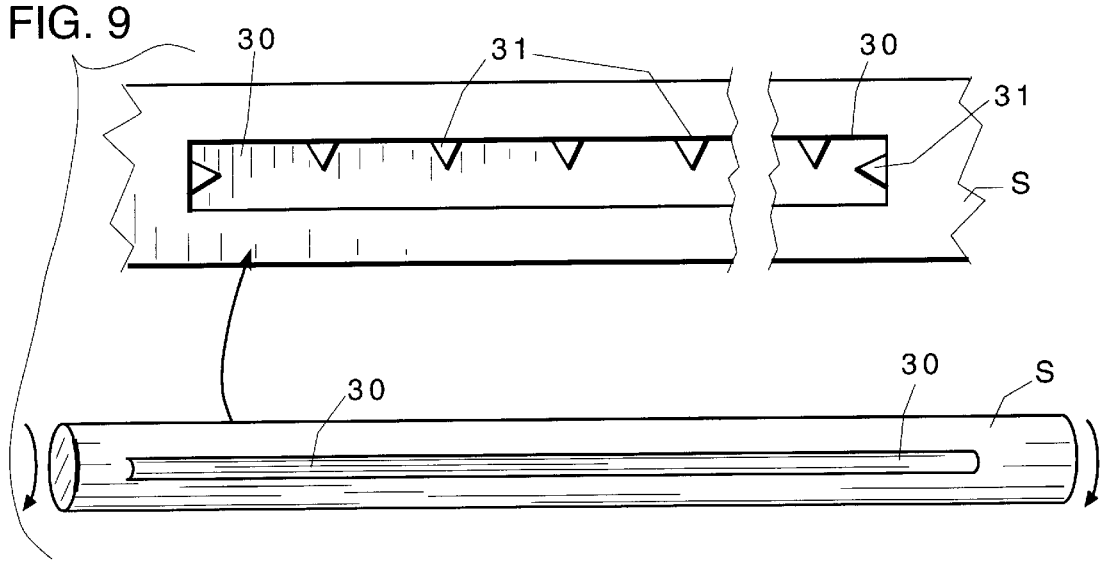
FIG. 9 is an enlarged view of the spool opening showing the flexible teeth.
Figure 10:
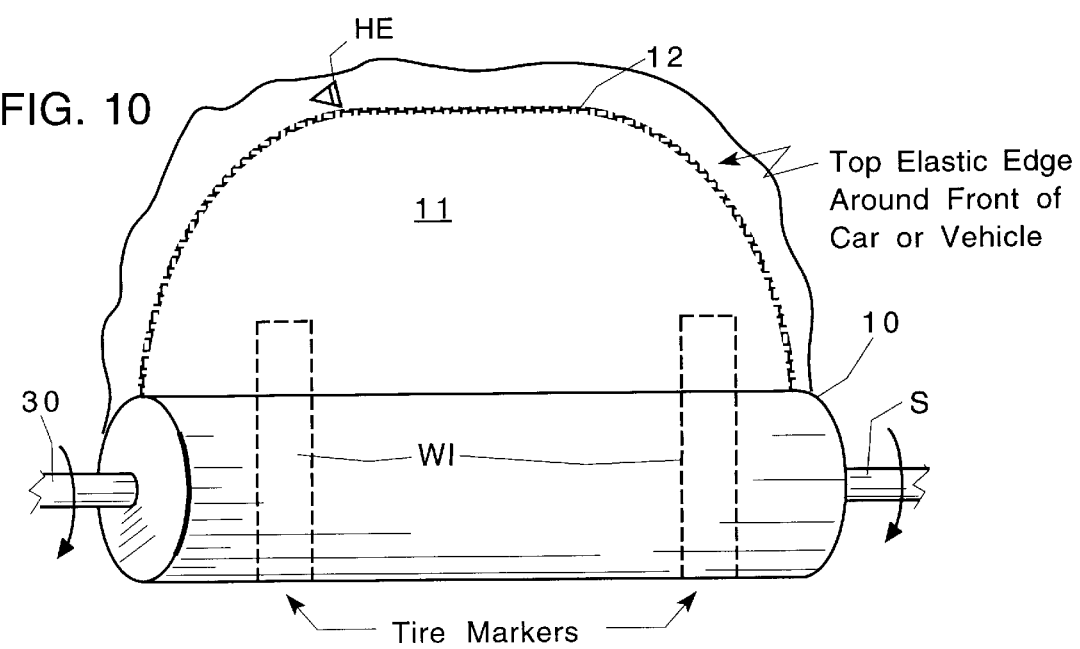
FIG. 10 is an illustration showing the unrolling of the bottom bag or cover portion of the vehicle flood protector of this invention.
Figure 11A:
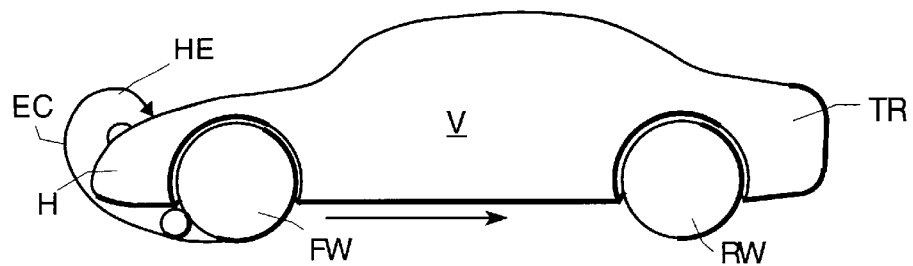
FIGS. 11A–11E are diagrammatic illustrations of the system of loading a vehicle into the bottom or lower container or bag portion of the vehicle protector of the present invention.
Figure 11B:
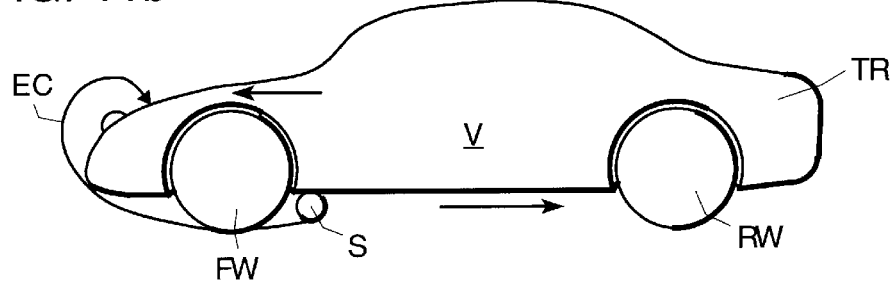
Figure 11C:
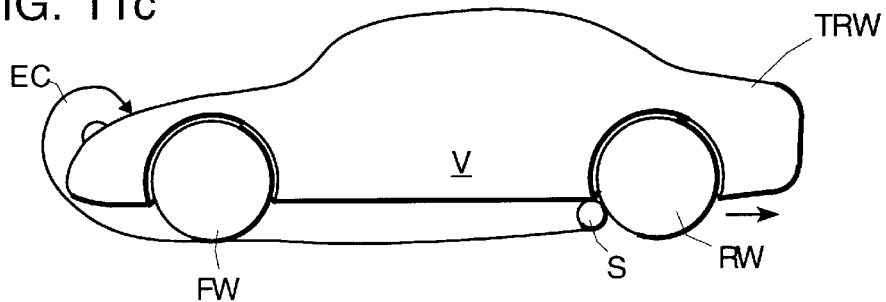
Figure 11D:
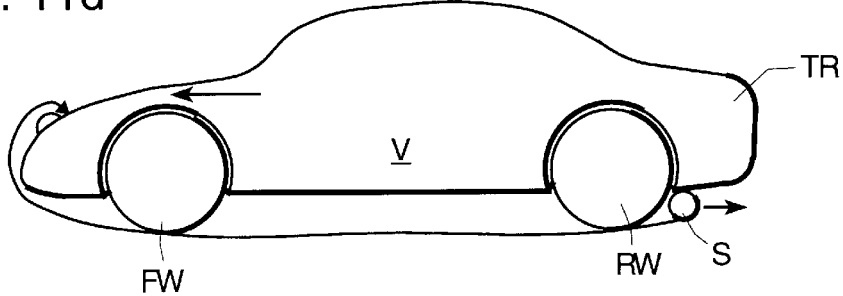
Figure 11E:
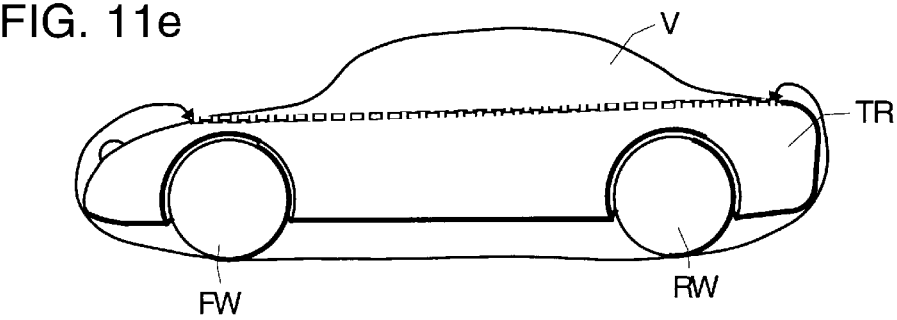
Figure 12A:
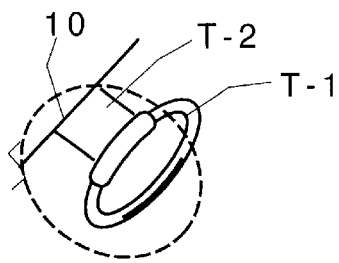
FIGS. 12A–12F are perspective views of details of the tethering or anchoring features of the invention.
Figure 12B:
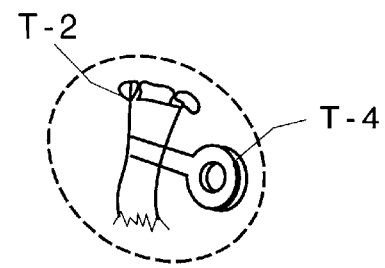
Figure 12C:
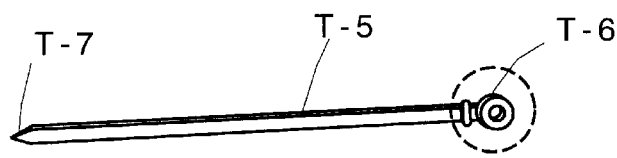
Figure 12D:
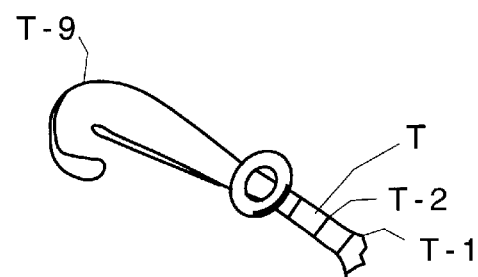
Figure 12E:
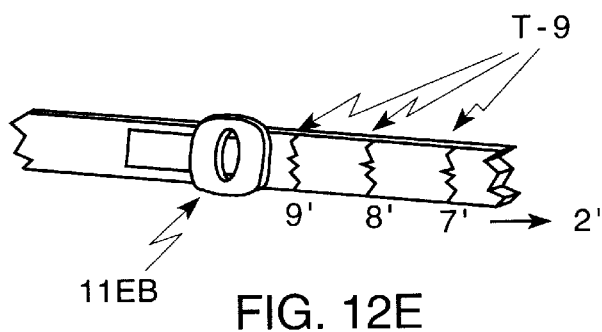
Figure 12F:
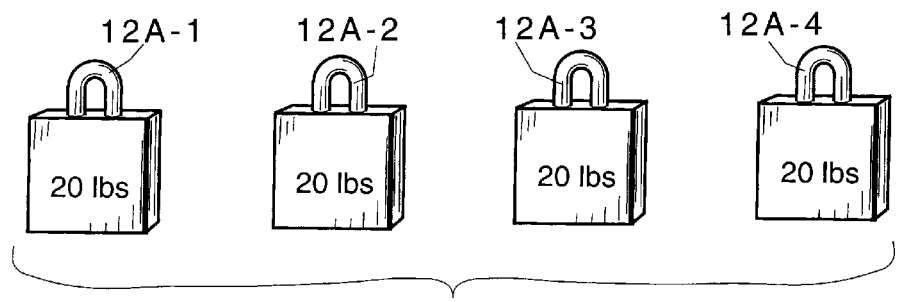
Figure 13:
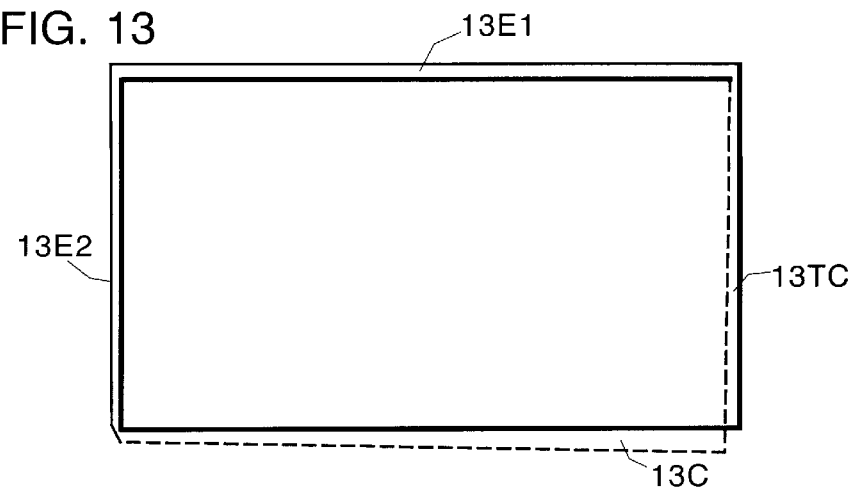
FIG. 13 is a top perspective view of a further embodiment of the invention in which the top and bottom covers are joined at two adjacent or interacting edges.
Figure 14:
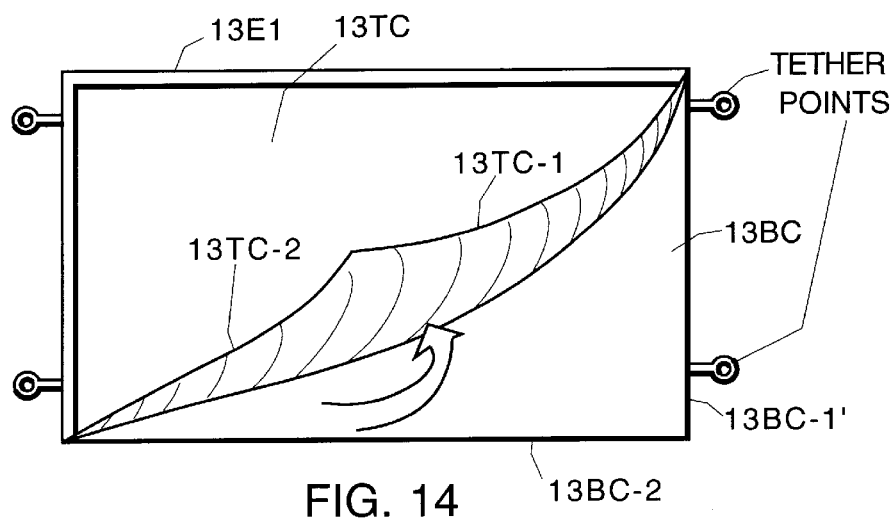
FIG. 14 is a top perspective view of the embodiment shown in FIG. 13 with lifted free edges of the top cover member to allow a car or other vehicle to be driven into the pocket and also show the tether attachments to the bottom cover.
Figure 20B:
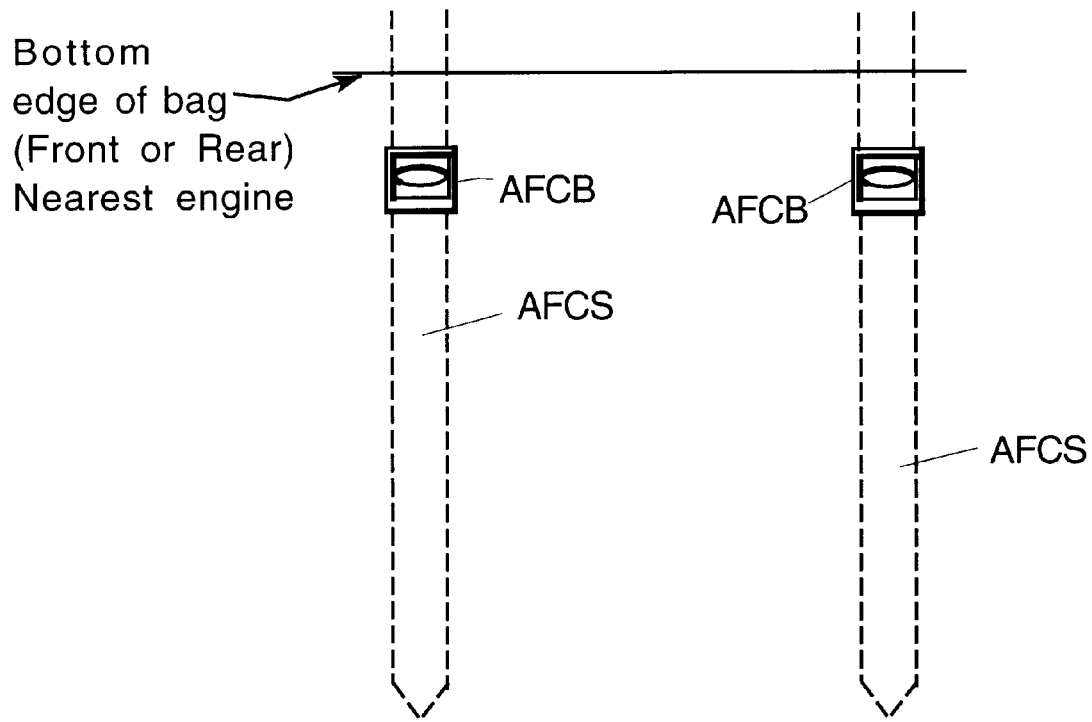
FIG. 20B illustrates the attaching straps for attaching the flotation container to a vehicle.
Figure 20A:
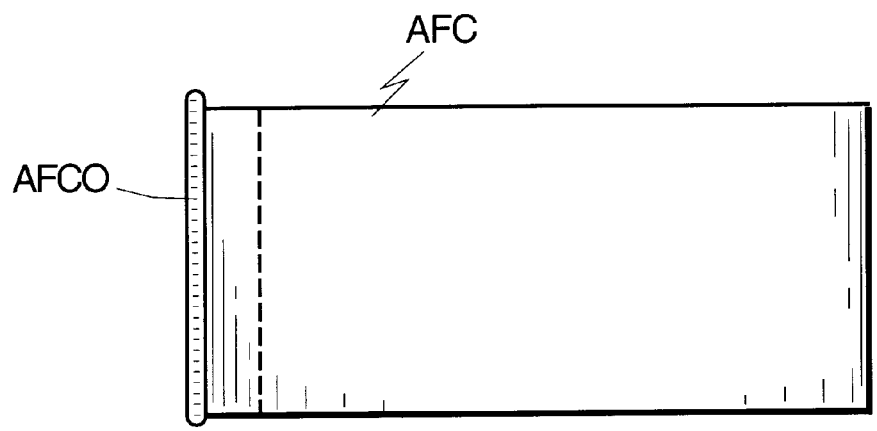
FIG. 20 illustrates an air-tight container for balancing the weight of the engine end of a vehicle.
FIG. 20C illustrates the air flotation container used as a storage device.
Figure 20C:
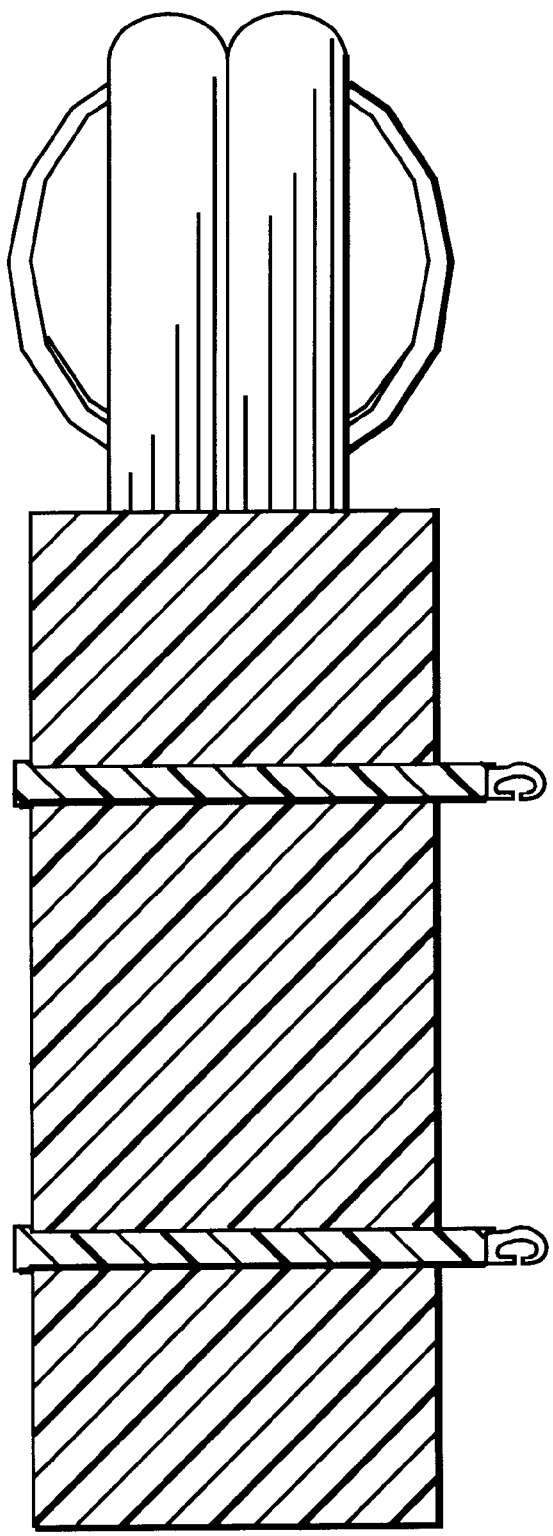

The bottom and top cover portions may be stored in flotation container AFC (FIG. 20C) or in a bag with the tethering or anchoring implements until impending flood water conditions warrant application to a vehicle to be protected. However, in a preferred embodiment, at least the lower cover portion is stored on a flexible spool or roller S, preferably a plastic roller or spool S of the type shown in FIGS. 6–10. In the embodiment shown in FIG. 6, the spool S assists in aligning the cover 10 and opening 11 with the wheels W of the vehicle. Optionally, red or black wheel alignment indicia WI can be used on the exterior of the cover, but after the hood or engine compartment end HE is fitted over the hood, and the excess provided for vehicle advancement into the cover, and the remaining rolled-up bottom cover tucked into the notch between the wheels and ground and pavement, no further alignment markings are required. As shown in FIG. 7, the bottom cover portion 10 is rolled up on a spool S with the opening 11 up or on the inside. Spool 11 has a slot or opening 30 with soft teeth 31 for retaining the inserted end of the bottom cover portion so that the lower or bottom cover portion 10 can be rolled up on spool S. FIG. 10 illustrates how the cover opening 11 and elastic edge 12 of the hood end HE of the lower cover are arrayed for fitting on the hood H of the vehicle V as depicted in FIG. 11A. As shown in FIG. 11A, the lower bag 10 is initially looped around the front or engine compartment H of the vehicle (an automobile or small pickup truck) and the spool or roller S is placed snugly in the notch formed by the front wheels FW and ground or pavement. Sufficient "excess" cover EC is pulled off of the roller S to allow for the vehicle V advancement over the roller S two times (front FW and rear RW wheels). The external surface of the bottom panel can have markings WI (FIG. 10) for wheel alignment and are matched with the vehicle wheels. The vehicle V is then driven or pushed forward just over the roller S and stopped (FIG. 11B). A portion of the excess loose cover is applied as the vehicle V enters the lower cover 10. The roller S is then unrolled to the rear wheels RW and placed snugly in the notch formed by the rear wheels RW and ground or pavement (FIG. 11C). The vehicle V is advanced forward over the roller and stopped (FIG. 11D). Then the remaining cover material is taken off of the roller S and placed over the rear or trunk portion TR of the vehicle V (FIG. 11E). The lower cover or bag portion 10 will be held snugly in place by the elastic band and/or drawstring or cord DS around the top or upper edges of the bottom or lower cover. The top or upper cover 20 is then placed over the top of the vehicle so that the lower edges LE of the top cover 20 overlays or overlaps the upper sides and edges UE of the bottom or lower cover 10. The top cover portion 20 is secured in place by an elastic 21 and/or drawstring or cord LDS. The tether or anchor attachments (FIGS. 12A–12D) are then applied or the vehicle tethered to a stationary object because the vehicle will float after sufficient flood water has accumulated. At this time the lengths of the tether straps T-8 are adjusted in length for the expected or anticipated flood water height. It will be appreciated that in the second disclosed embodiment the fitting of the bottom cover portion to the vehicle can begin from the rear or trunk area TR.

Figure 15:
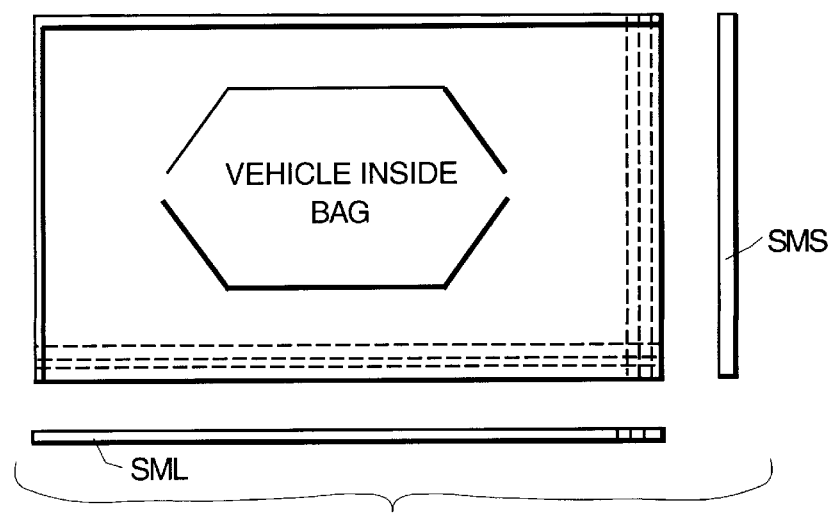
FIG. 15 is a top perspective view of the embodiment of FIGS. 13 and 14 with a vehicle inside the bag and the side and end seal members.
Figure 16:
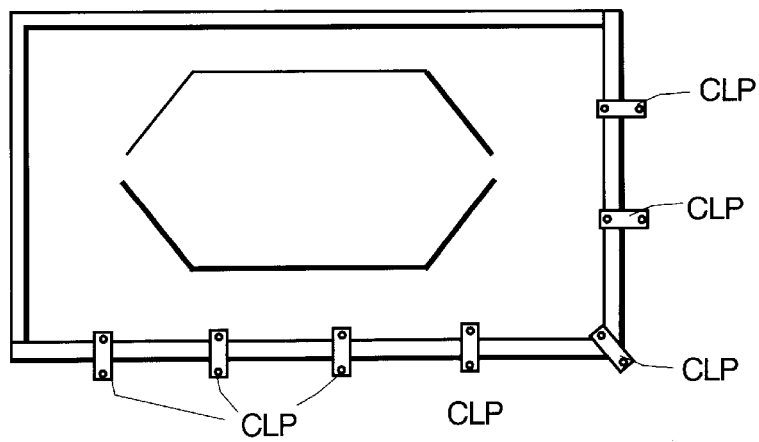
FIG. 16 is a top view showing the free edges after being rolled up on the seal members with a plurality of soft clamp elements for maintaining the seal.
Figure 17:
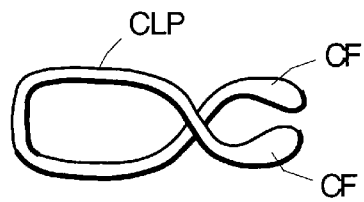
FIG. 17 illustrates the spring clamps used to maintain the seal in FIG. 16.
Figure 18:
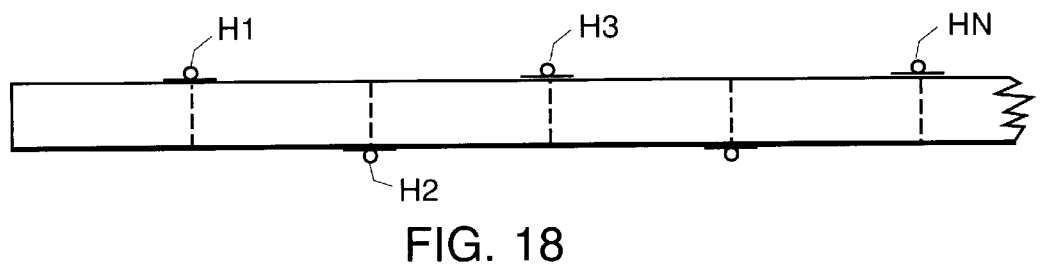
FIG. 18 is a top plan view of the seal stick.

Referring now to the embodiment shown in FIGS. 13–18, a rectangular bottom cover sheet 13BC and a generally congruent rectangular top cover sheet 13TC are hermetically sealed and joined at two intersecting edges 13E-1 and 13E-2 and the edges 13TC-1, 13TC-2, 13BC-1 and 13BC-2 are free so that top cover sheet TC can be pulled back to open the pocket between the cover sheets and held open while a vehicle is driven or pushed into the vehicle pocket. FIG. 15 shows a car inside the bag with stick or rod seal members being shown adjacent the unsealed edges ready to be rolled up and sealed. The seal sticks or rods SMS and SML are shown in FIG. 18. They vary in length according to car size and are preferably hinged as at H-1, H-2 . . . H-n so that they can be folded for compactness. Although they could be made round, they are preferably rectangular (2.5"×1"). The seal member SML is shorter than the overall length of the cover members 12TC and 12BC by about three circumference measures of seal member SMS to provide ample surface area to make a good seal. In this embodiment, the long seal member for the longest portion of the rectangle is placed on the long edges of the two cover members with the two cover edges in apposition. The covers (top and bottom) are tightly folded over the width of the stick three or more times so as to effect a seal. The large clamps CLP, having rubber or elastomeric shielded contact fingers CF, are then applied to maintain the seal. The unfolded (straight) seal member SMS for the width of the container is then placed at the edges 13TC-2 and 13BC-2 with the cover edges in apposition and are likewise folded over the width of the seal member three or more times and are fixed in place with clamp SCLP. The container will now be essentially water (and air) tight or sealed. Tether or anchor attachments or straps 16" and 17" are secured to the lower cover sheet. The tether straps are secured to a stationary object with a predetermined length of tether as described earlier until the flood threat is over.

Figure 19A:
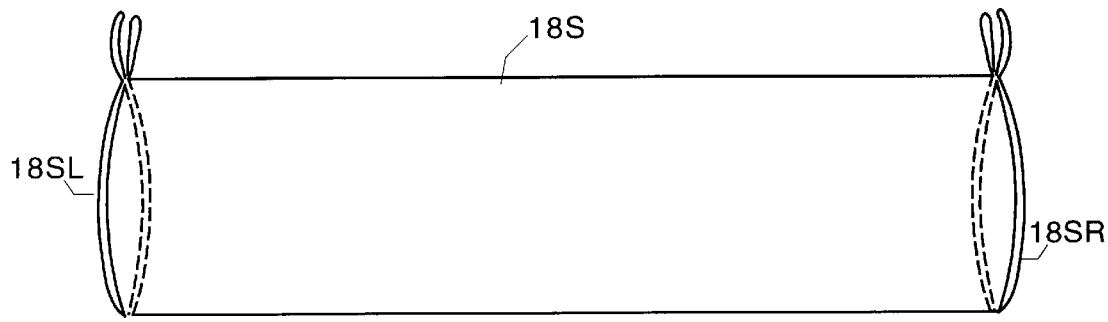
FIGS. 19A; 19B and 19C illustrate a further embodiment of the invention wherein a plastic sleeve is used.
Figure 19B:
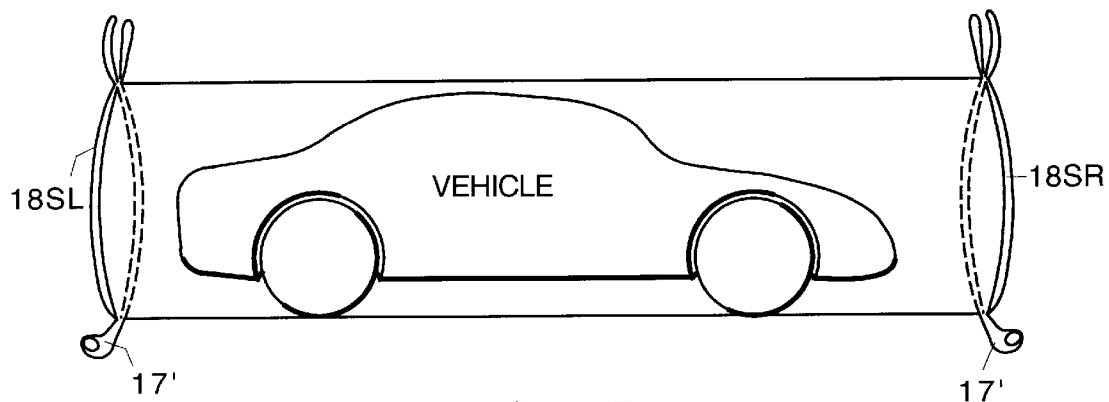
Figure 19C:
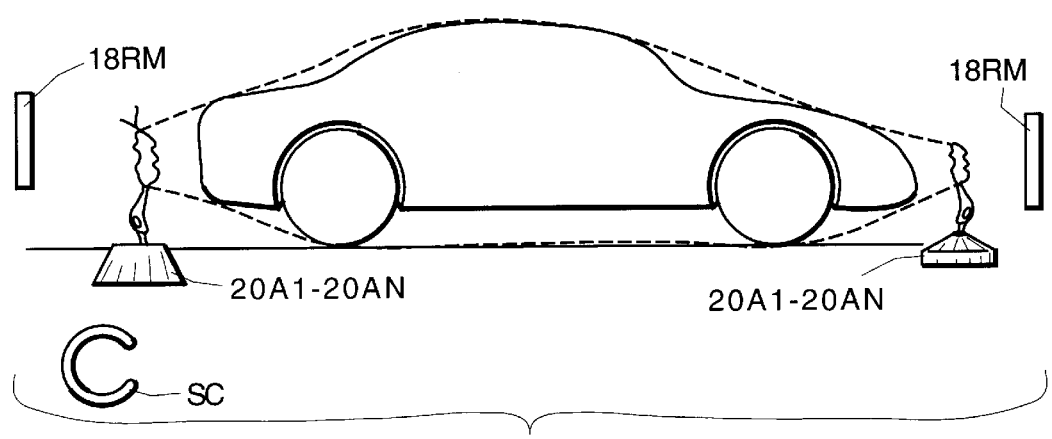

In the embodiment shown in FIGS. 19A, 19B and 19C, a sleeve 18S having open ends 18S-L and 18S-R sized to allow a vehicle to be driven inside the sleeve. One end of the sleeve is fitted over the front or rear of the vehicle. An assistant holds open the opposite end and the car is driven (or backed) further into the bag or sleeve to approximately the center of the sleeve (or bag) and the two open ends 18S-L and 18S-R are pulled closed and made watertight by rolling them on rigid members 18RM (such as 2×4's) three or four times and clamping the rolled ends on the rigid members by clamps 18SC to keep it watertight. Then the anchor is placed and the level maintaining ballast air barrels may be attached as desired.

Figure 21A:
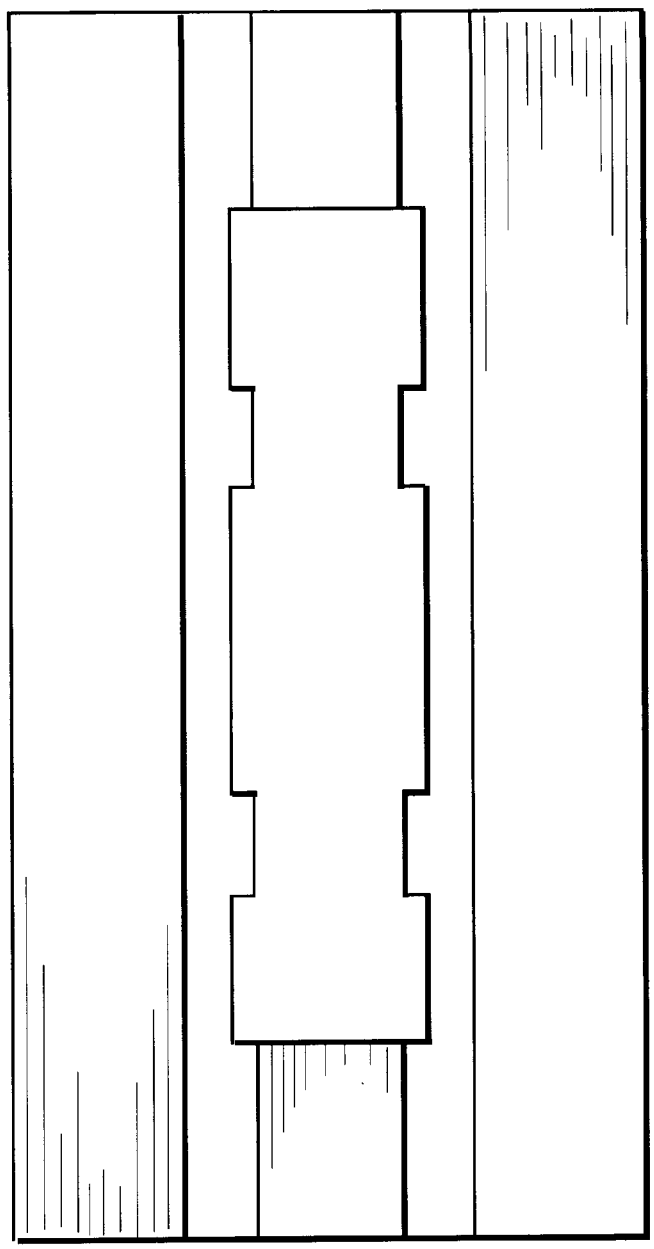
FIG. 21 is a top plan view with indications of function of each section and FIG. 21B is a side elevational view thereof with functional indicators shown.
Figure 21B:
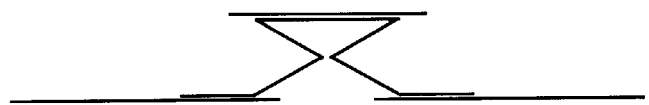

In each of the embodiments, the lower container or bag portion engaged by the vehicle tires or which can come in contact with the sharp parts of the vehicle, a burlap or other puncture-resistive material bonded with adhesive can be placed at selected locations to avoid puncture. For example, hydrostatic pressure on the underside of the lower bag portion can push against the lower surfaces of the vehicle between the wheels. These portions are protected by the puncture proofing described above. To remove stress in the material due to hydrostatic pressure in the space between the wheels, folds of the cover material between the wheels allows the lower bag between the wheels to bear against the underside of the vehicle. See FIGS. 21A and 21B.

While various preferred embodiments of the invention have been described and illustrated, it will be appreciated that various adaptations, modifications and changes will occur to those skilled in the art. For example, the top cover can be integrally attached to the bottom cover portion. Improved cover materials reducing their weight, bulk and cost are contemplated. Spaced snap fasteners can be used to secure the top cover to the bottom cover portions.

What is claimed is:

1. A motor vehicle flood protection apparatus, comprising a water-impervious flexible lower container cover member including a bottom panel having a first perimetrical edge, a top cover member with a second perimetrical edge congruent to said first perimetrical edge, means joining said cover members along said perimetrical edges to enclose a vehicle therebetween such that the vehicle and water-impervious flexible lower container cover member float when flood waters are at a predetermined level, and means for anchoring said lower container cover member to a stationary object with a flexible member having a predetermined length, wherein said perimetrical edge has four edges and means hermetically seal three congruent ones of said edges and, the fourth of said edges is sealed by rolling on a rigid member to constitute a rolled fourth edge and clamp means on said rolled fourth edge.

2. A motor vehicle flood protection apparatus, comprising a lower plastic container member having a rectangular bottom panel and integrally joined end, and side panels that have lateral edges joined to form a vehicle container, said end and side panels having a vertical height that is less than the height of a vehicle to be flood protected but well above the float level for the vehicle type and of sufficient height that, when surrounded by flood waters, said container floats with the vehicle carried therein, a cover member joined to said container to prevent rain water from entering said container, and an anchor means for securing said lower plastic container member to a stationary object.

3. The motor vehicle flood protection apparatus defined in claim 2 wherein said anchor means includes a plurality of anchor members secured in spaced relation around said container member.

4. The motor vehicle flood protection apparatus defined in claim 3 in which said anchor means includes an adjustable tether line member.

5. The motor vehicle flood protection apparatus defined in claim 2 including a plastic roll-up member upon which said container is rolled to maintain the lateral edges spaced apart at least the distance between the outside edges of the wheels of said vehicle.

6. The motor vehicle flood protection apparatus defined in claim 5 wherein said plastic roll-up member has a slot for receiving said container.

7. The motor vehicle flood protection apparatus defined in claim 6 wherein said roll-up member has flexible teeth projecting in said slot.

8. The motor vehicle flood protection apparatus defined in claim 5, further including elastic hem in said upper edges of said side walls and said other end wall.

9. The motor vehicle flood protection apparatus defined in claim 8 wherein said bottom panel includes a layer of spun bound polypropylene.

10. A motor vehicle flood protection apparatus, comprising a water-impervious flexible plastic container having a bottom panel, said bottom panel having a perimetrical edge with two long sides and two short sides, side and end walls, each of said walls having upper and lower edges with said lower edge being integrally joined to said perimetrical edge of said bottom panel,
a top cover panel having four perimetrical edges, spaced connector members one of said perimetrical edges of said top cover opposite said one of said perimetrical edges on said bottom panel and coacting with correspondingly spaced connectors along the upper edge of the other of said end walls,
gathering rope a gathering rope passage formed in the upper edges of said side walls and said other end wall, said gathering rope pulling said upper edges of said side walls and said other end wall snugly against an upper passenger compartment portion of a protected vehicle so that said lateral perimetrical edges of said top cover panel are overlapped and positioned below said upper edges of said walls so that water flowing over lower edges of said top cover engages said plastic container substantially below said upper edges.

11. The motor vehicle flood protection apparatus defined in claim 10 including a tether anchor member secured to said flexible plastic bag adjacent said lower edges and an anchor stake releasably secured to said tether anchor.

12. A motor vehicle flood protection apparatus, comprising a water-impervious flexible plastic cylindrical sleeve bag at least one open end for receiving a motor vehicle, a rigid rod member, said at least one open end being adapted to be rolled on said rigid rod member, and clamp means for clamping the rolled plastic on said rigid rod member such that when flood water levels reach a predetermined flood water level the sleeve bag and vehicle floats in said flood waters.

13. A motor vehicle flood protection method, comprising providing a water-impervious flexible lower container having a bottom panel, said bottom panel having a perimetrical edge with two long sides and two short sides,
providing a top cover member having a perimetrical edge,
mating said lower container and cover member along the perimetrical edges thereof to enclose a vehicle therebetween such that the vehicle and water-impervious flexible lower container float when flood waters are at a predetermined level, and
anchoring said water-impervious lower container to a stationary object with a flexible member having a predetermined length.

14. A motor vehicle flood protection apparatus, comprising a lower plastic container member having a bottom panel and integrally joined end, and side panels that have lateral edges joined to form a vehicle container, said end and side panels having a vertical height that is less than the height of a vehicle to be flood-protected but of sufficient height that, when surrounded by flood waters, said container floats with the vehicle therein, said end and wall panels having upper edges, a snugging device for tightening said upper edges of said end and side panels against the upper passenger compartment of said vehicle, and a tether means for securing said lower plastic container member to a stationary object.

15. A personal property flood protection apparatus, comprising a flexible plastic container member having a bottom panel integrally joined to end and side panels that have lateral edges joined to form a personal property container, said end and side panels having a vertical height sufficient such that, when surrounded by flood waters, said container floats with the personal property therein, said end and wall panels having upper edges, a snugging device for tightening said upper edges of said end and side panels against said personal property, and a tether means for securing said lower plastic container member to a stationary object.

16. A motor vehicle flood protection apparatus, comprising a lower rectangular plastic container member, tether strap members secured to said lower rectangular plastic container member, said tether strap members being adapted to anchor said lower rectangular plastic container member to a stationary spot, a top cover member which is substantially congruent to said lower rectangular plastic container member, said cover member having two intersecting edges which are hermetically sealed together and form a vehicle pocket and two congruent free edges, respectively, a pair of seal members, each seal member being adapted to be rolled up in said free edges, respectively, and clip means for sealing a vehicle in said vehicle pocket, whereby, when surrounded by flood waters, said apparatus floats with the vehicle therein, and said tether strap members secure said lower plastic container member to said stationary object.

17. The motor vehicle flood protection apparatus defined in claim 16 wherein each said seal member is hinged so that it can be folded for compactness.

18. The motor vehicle flood protection apparatus defined in claim 16 wherein said clip means are spring clamps having elastomeric cushion elements.

\* \* \* \* \*